UNITED STATES PATENT OFFICE.

WARREN T. BILLINGS, OF DOVER, NEW HAMPSHIRE, ASSIGNOR TO WILLIAM P. UPHAM, OF KEENE, NEW HAMPSHIRE.

MEDICATED PRINTERS' INK.

1,233,962.
Specification of Letters Patent.
Patented July 17, 1917.

No Drawing.
Application filed March 10, 1915. Serial No. 13,467.

*To all whom it may concern:*

Be it known that I, WARREN T. BILLINGS, a citizen of the United States, residing at Dover, county of Strafford, State of New Hampshire, have invented an Improvement in Medicated Printers' Ink, of which the following is a specification.

This invention has for its object to provide a medicated printers' ink which can be used for printing advertisements or other matter on paper or cloth that is used for sanitary purposes, so that when such printed paper or cloth is put to the use to which it is designed not only will there be no harmful effects resulting from the presence of the printers' ink, but, on the contrary, said ink, on account of its medicinal properties, will have beneficial effects. It is my intention to use this medicated printers' ink for printing advertisements or other matter on any paper or cloth which may be used for sanitary purposes, such, for instance, as toilet paper, paper napkins, paper towels, etc. By this means toilet paper, paper napkins, paper towels, and other similar paper articles which are designed for single service only can be given a greatly added value because of the advertisements which they carry, while at the same time increasing rather than diminishing their sanitary properties.

In making my improved medicated ink I take certain ingredients having medicinal properties and which can be readily mixed, and then add to this mixture a sufficient amount of printers' varnish and oil to produce a composition of the proper consistency and traction for the press rollers.

I find that a composition made in accordance with the following formula gives excellent results:

1 part by weight nutgalls;
2 parts by weight fir balsam;
2 parts by weight extract of hemlock;
3 parts by weight beeswax;
1 part by weight balsam pine;
2 parts by weight carbolated vaseline;
Trace of oil of bergamot or some other material to give the composition a pleasant odor;
Printers' varnish and oil.

In making the composition I first mix together in proper proportions all of the ingredients except the printers' varnish and oil and then I add to this mixture a sufficient quantity of the printers' varnish and oil to make a composition of the proper consistency and traction for the press rollers.

The amount of printers' varnish and oil will depend something on the temperature, it being only necessary to use sufficient to obtain an inking composition which will work well in the printing press. The nutgalls, fir balsam, extract of hemlock, balsam pine and carbolated vaseline all have medicinal properties which are of benefit. The beeswax gives to the composition a more or less waxy characteristic which is beneficial in using the composition, and the vaseline in addition to its medicinal properties, furnishes a softening ingredient which coöperates with the other elements to produce the desired result.

While I have given above one particular formula, yet I desire to state that the proportions of the ingredients may be varied without departing from the invention.

I claim:

1. A medicated printers' ink comprising nutgalls, fir balsam, extract of hemlock, beeswax, balsam pine, carbolated vaseline and printers' varnish and oil substantially in the proportions described.

2. A medicated printers' ink comprising a medicinal composition having one part by weight of nutgalls, two parts by weight fir balsam, two parts by weight extract of hemlock, three parts by weight beeswax, one part by weight balsam pine, two parts by weight carbolated vaseline, which composition is mixed with printers' varnish and oil substantially in the proportions described.

In testimony whereof, I have signed my name to this specification, in the presence of two subscribing witnesses.

WARREN T. BILLINGS.

Witnesses:
ALICE P. STEVENS,
JOHN QUINN.